(12) United States Patent
Luo et al.

(10) Patent No.: US 7,165,462 B2
(45) Date of Patent: Jan. 23, 2007

(54) INDIVIDUAL SLIDER TESTING

(75) Inventors: Jih-Shiuan Luo, San Jose, CA (US); Ali Sanayei, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 0 days.

(21) Appl. No.: 10/999,184

(22) Filed: Nov. 29, 2004

(65) Prior Publication Data

US 2006/0112770 A1 Jun. 1, 2006

(51) Int. Cl.
*G01N 3/02* (2006.01)
*G01R 33/12* (2006.01)

(52) U.S. Cl. ........................................ 73/856; 324/212
(58) Field of Classification Search ........... 324/207.21, 324/209, 210, 211, 213; 73/856
See application file for complete search history.

(56) References Cited

U.S. PATENT DOCUMENTS

| | | | |
|---|---|---|---|
| 4,763,405 A | 8/1988 | Morita et al. | |
| 5,038,625 A | 8/1991 | Chen | |
| 5,758,406 A | 6/1998 | Hunsaker et al. | |
| 5,970,603 A | 10/1999 | Quintana et al. | |
| 5,974,657 A | 11/1999 | Fox et al. | |
| 5,987,725 A | 11/1999 | Church et al. | |
| 6,162,114 A | 12/2000 | Kobayashi et al. | |
| 6,261,165 B1 | 7/2001 | Lackey et al. | |
| 6,269,687 B1 * | 8/2001 | Zhang et al. | 73/105 |
| 6,275,028 B1 * | 8/2001 | Matsui et al. | 324/210 |
| 6,346,809 B1 | 2/2002 | Karam, II | |
| 6,361,399 B2 * | 3/2002 | Kobayashi et al. | 451/5 |
| 6,373,660 B1 * | 4/2002 | Lam et al. | 360/234.5 |
| 6,531,084 B1 * | 3/2003 | Strom et al. | 264/400 |
| 6,709,877 B2 | 3/2004 | Tsui et al. | |
| 6,950,117 B2 * | 9/2005 | Mahadev et al. | 451/37 |

* cited by examiner

*Primary Examiner*—Michael Cygan
*Assistant Examiner*—Octavia Davis (57) ABSTRACT

Systems and methods of testing individual sliders are disclosed. One embodiment is a test system that includes a mechanical stress system, a quasi-static measurement system, a transport system, and a slider holder. The individual sliders to be tested are aligned in a row in the slider holder, and the slider holder secures the sliders. The measurement system performs quasi-static measurements on sliders in the slider holder simultaneously. The transport system then transports the slider holder to the mechanical stress system. The mechanical stress system applies mechanical stress to the sliders in slider holder. The transport system then transports the slider holder again to the quasi-static measurement system. This process repeats a desired number of times to complete testing.

26 Claims, 10 Drawing Sheets

INDIVIDUAL SLIDER TESTING

BACKGROUND OF THE INVENTION

1. Field of the Invention

The invention is related to the field of magnetic storage devices, and in particular, to systems and methods for testing individual sliders for magnetic storage devices.

2. Statement of the Problem

Many computer systems use disk drives for mass storage of information. Disk drives typically include one or more sliders positioned proximate to a storage media. The sliders include read and write elements that read from and write to the storage media. One type of slider includes a Giant Magneto-Resistive (GMR) read element. To read data from the storage media, the storage media spins and magnetic data in the media generates a localized magnetic field. The magnetic field modulates the resistance of a magneto-resistive (MR) element in the slider. The change in resistance of the MR element is detected by passing a sense current through the MR element and then measuring the change in voltage across the MR element. The resulting signal is used to recover the data encoded on the storage media. To write data to the storage media, an inductive element in the slider produces a magnetic field that records the data on the storage media.

Sliders are typically manufactured on a single substrate wafer that includes an array of sliders. The sliders are arranged in rows on the wafer. When cutting the wafer, the wafer is first cut into rows of sliders. While the sliders are in an attached row, the surfaces of the sliders are lapped. The lapping process creates a desired height for the MR element which provides a desired magnetic characteristic for the MR element. The resistance of the MR element to a given magnetic field may reflect the desired magnetic characteristics of the MR element. The sliders are also etched to create a desired air bearing surface (ABS) on each slider to allow the slider to fly a desired height above a storage media. The individual sliders in the attached row are then cut and mounted in a head-gimble assembly (HGA).

One problem affecting performance on GMR read elements is pinned layer reversal. In normal operation of a slider, a magnetic field directed into the ABS of the slider is reflected by a positive change in the resistance of the MR element in the slider. A magnetic field directed away from the slider is reflected by a negative change, consequently, in the resistance of the MR element. With pinned layer reversal, a magnetic field directed into the slider is reflected by a negative change in the resistance of the MR element and a magnetic field directed away is reflected by a positive change. Pinned layer reversal causes the MR element to inaccurately read data from a storage media. Pinned layer reversal may be caused by Electro-Static Discharge (ESD), mechanical stress from manufacturing, mechanical stress from head and disk interaction, handling, or other factors.

Various measurements are developed to verify MR element robustness against pinned layer reversal in either the design or manufacturing phase. For the effect of mechanical stress, a test operator alternates between applying stress to sliders in a row and performing quasi-static measurements. The effect of the stress to the pinned layer reversal is understood by comparing quasi-static measurements before and after each stress application. Sliders are currently tested while they are still in a row. Each slider is first tested one at a time with a quasi-static measurement system. In quasi-static measurements, a first slider in the row is positioned proximate to a magnet and then a measurement system is landed onto conductive pads on the deposit end of the first slider to measure magnetic performances of the MR element in the first slider. After the measurements on the first slider are done, the next slider is moved to the position for measurements. The process repeats until the measurements are performed on each slider along the row.

For applying mechanical stress on each slider, the test operator performs a mechanical stress procedure to apply stress to the sliders with a mechanical stress module. The test operator lands a mechanical probe on a slider at one end of the row. One of the choices for the mechanical probe is a pair of ESD tweezers. The mechanical probe slides along the edge joining the air bearing surface (ABS) and the deposit end of each slider. The sliding motion of the mechanical probe applies mechanical stress to the edge of each slider and consequently applies stress to the MR element in each slider. The amount of stress applied to the edge depends on the amount of weight added to the mechanical stress module. After the stress is applied, the test operator again takes the row out of the mechanical stress module and places it on the quasi-static measurement system for quasi-static measurements on each slider. The test operator alternates between applying mechanical stress to the edges of the sliders with increasing weight, and taking quasi-static measurements to test the MR elements in the sliders. This testing procedure is illustrated below in FIGS. 1, 2, and 3A–B.

One problem with the current testing procedure is that the sliders are tested while the sliders are still in an attached row. It may be desirable to test individual sliders that are not in an attached row, but this is not feasible with the current tester capability because it is very difficult to manually land the current mechanical probe on a slider of a 1 mm width. If a low yield is provided for testing, one should only measure good heads along the row and the overall throughput can be very low. Also, it may be desirable to test sliders with multiple MR element designs at the same time under the same test conditions. This is not currently allowed because sliders in an attached row are inevitably of the same design.

Another problem with the current testing procedure is that the procedure is manual. There is significant manual handling of the sliders between the quasi-static measurements and the mechanical stress procedure which may cause mechanical stress not quantified by the tests. There is also a risk of ESD affecting the sliders. These conditions may negatively affect the accuracy of the tests.

Another problem with the current testing procedure is that the quasi-static measurements are inefficient in that they are performed one at a time on a row of sliders.

SUMMARY OF THE INVENTION

The invention solves the above and other related problems with systems and methods that provide for testing of individual sliders. One embodiment of the invention is a test system for testing individual sliders. The test system includes a mechanical stress system, a quasi-static measurement system, a transport system between the mechanical stress system and the quasi-static measurement system, and a slider holder. The individual sliders to be tested are aligned in a row in the slider holder that secures the sliders. The slider holder is then placed on the transport system for transporting between the mechanical stress system and the quasi-static measurement system. The quasi-static measure ment system performs quasi-static measurements on each of the sliders in the slider holder simultaneously. The transport system then transports the slider holder to the mechanical stress system. The mechanical stress system applies mechanical stress to the sliders in the slider holder. For instance, the mechanical stress system slides a probe along an edge of each of the sliders common to their air bearing surface (ABS) and their deposit end. The transport system then transports the slider holder again to the quasi-static measurement system. This process repeats a desired number of times to complete testing. Each time the mechanical stress system applies stress to the sliders, the mechanical stress system may increase the stress level applied to the sliders.

The test system provides many advantages over the prior test procedures. The test system allows for testing of individual sliders which was not feasible with previous test procedures. The slider holder of the test system secures individual sliders in a row form factor to allow for testing of multiple individual sliders at the same time. Because individual sliders are tested, sliders of different designs may be inserted in the slider holder and tested at the same time. Consequently, sliders of different designs can be evaluated under the same test conditions.

Another advantage is that the test system is more robust against unwanted mechanical stress or ESD. The individual sliders under test are secured in the slider holder throughout the testing procedure. The slider holder is transported between the quasi-static measurement system and the mechanical stress system over the transport system. This eliminates or reduces the need for manually handling the sliders under test.

Another advantage is that the test system is more efficient than prior test procedures. The test system can be fully automated. The mechanical stress system, the quasi-static measurement system, and the transport system can each be fully automated to reduce testing time. Also, the measurement system is able to perform quasi-static measurements on the sliders simultaneously instead of one at a time.

The invention may include other exemplary embodiments described below.

DESCRIPTION OF THE DRAWINGS

The same reference number represents the same element on all drawings.

DETAILED DESCRIPTION OF THE INVENTION

FIGS. 1, 2, and 3A–B illustrate a current procedure for testing sliders. The current test procedure alternates between applying stress to sliders in a row and performing quasi-static measurements to determine the effects of the applied stress on the sliders.

Figure 1:
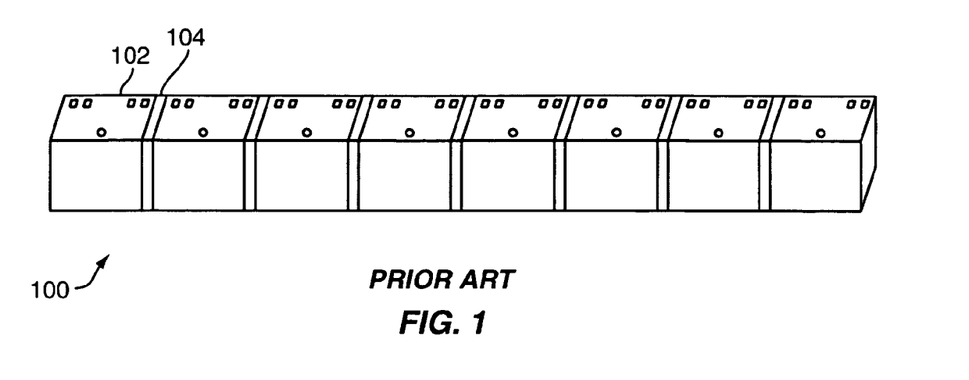
FIG. 1 illustrates an attached row of sliders that has been cut from a wafer.

FIG. 1 illustrates an attached row 100 of sliders that has been cut from a wafer. Row 100 includes a plurality of sliders 102 connected by kerfs 104. Although eight sliders are shown, a typical row may include many more sliders.

Figure 2:
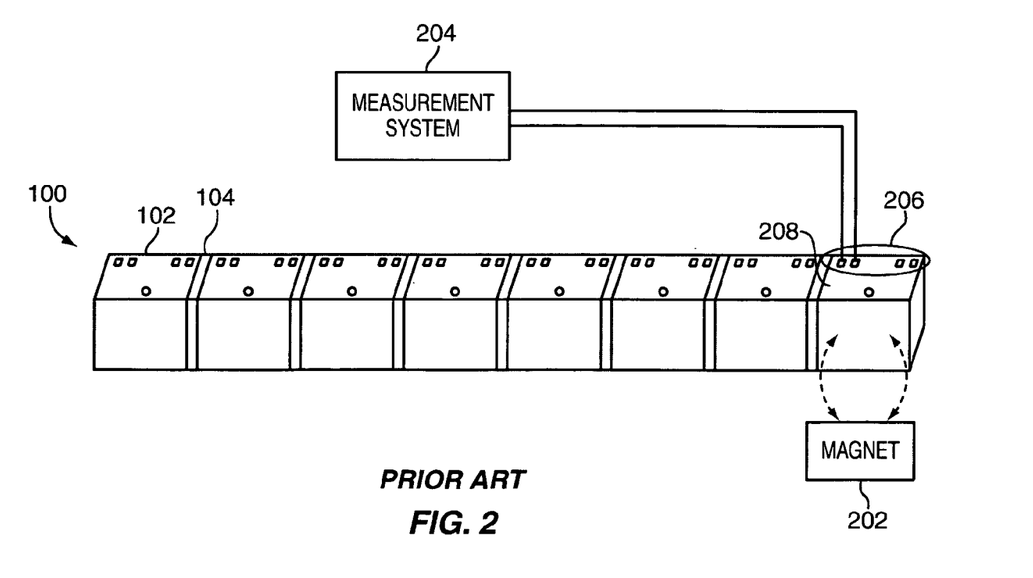
FIG. 2 illustrates a current quasi-static measurement for a row of sliders.

To test the sliders, a test operator performs a quasi-static measurement on each slider 102 in row 100 one at a time. FIG. 2 illustrates a quasi-static measurement for a row of sliders. The test operator positions a first slider in the row 100 of sliders proximate to a magnet 202 of a quasi-static measurement system. The test operator then lands a measurement system 204 of the quasi-static measurement system on conductive pads 206 on the deposit end 208 of the first slider to perform quasi-static measurements on the MR element (not shown) in the first slider. After the measurements on the first slider are done, the next slider is moved to the position for measurements. The process repeats until the measurements are performed on each slider 102 in row 100.

Figure 3A:
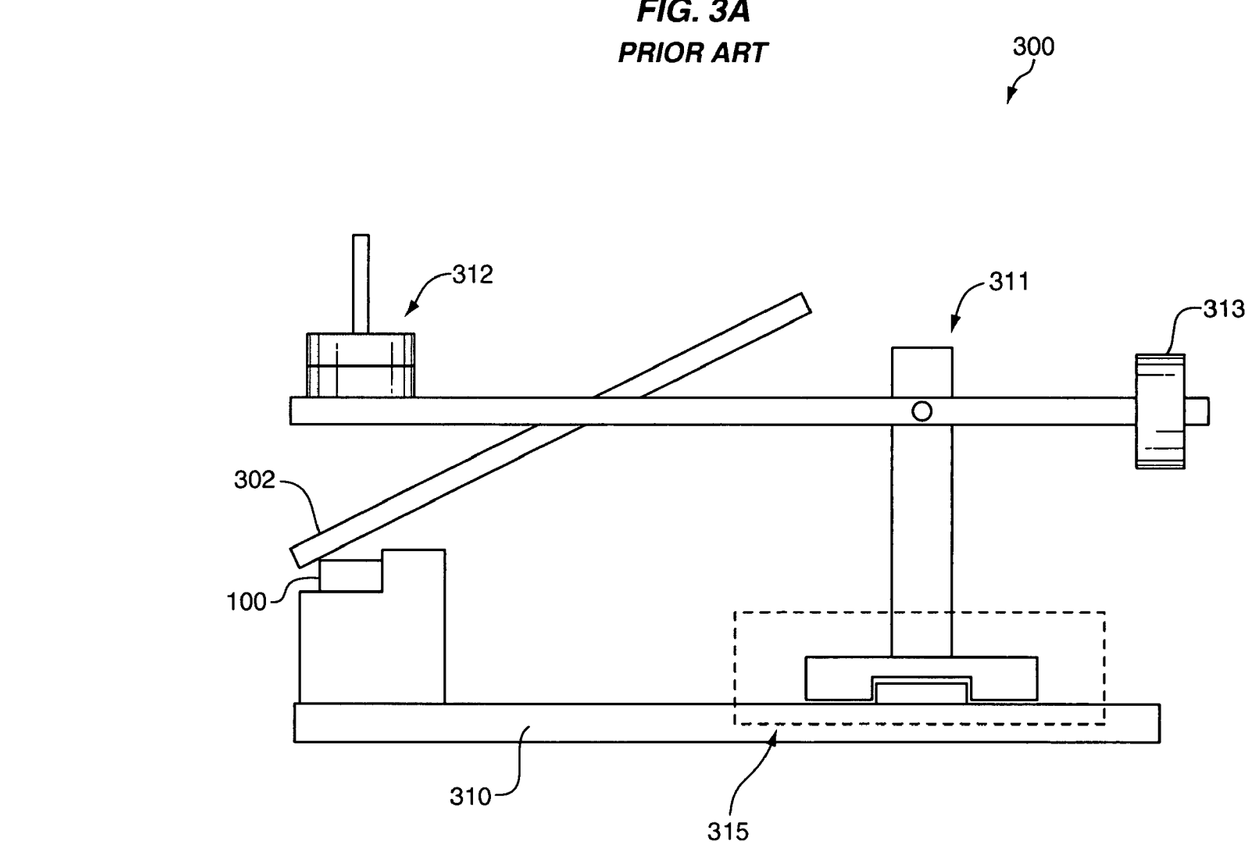
FIG. 3A illustrates a mechanical stress module.

After the quasi-static measurements are performed on each slider 102, the test operator applies mechanical stress to the sliders 102 in row 100. FIG. 3A illustrates a mechanical stress module 300. Mechanical stress module 300 is attached to a bench 310. Mechanical stress module 300 includes a mechanical probe 302 attached to a pivoting apparatus 311. Mechanical probe 302 is configured to contact the row 100 of sliders 102 inserted in mechanical stress module 300. Weights 312 and counter weights 313 are attached to pivoting apparatus 311 to adjust the amount of stress applied to the row 100 by mechanical probe 302. Pivoting apparatus 311 is attached to ball-bearing linear motion system 315 to allow mechanical probe 302 to move along row 100.

Figure 3B:
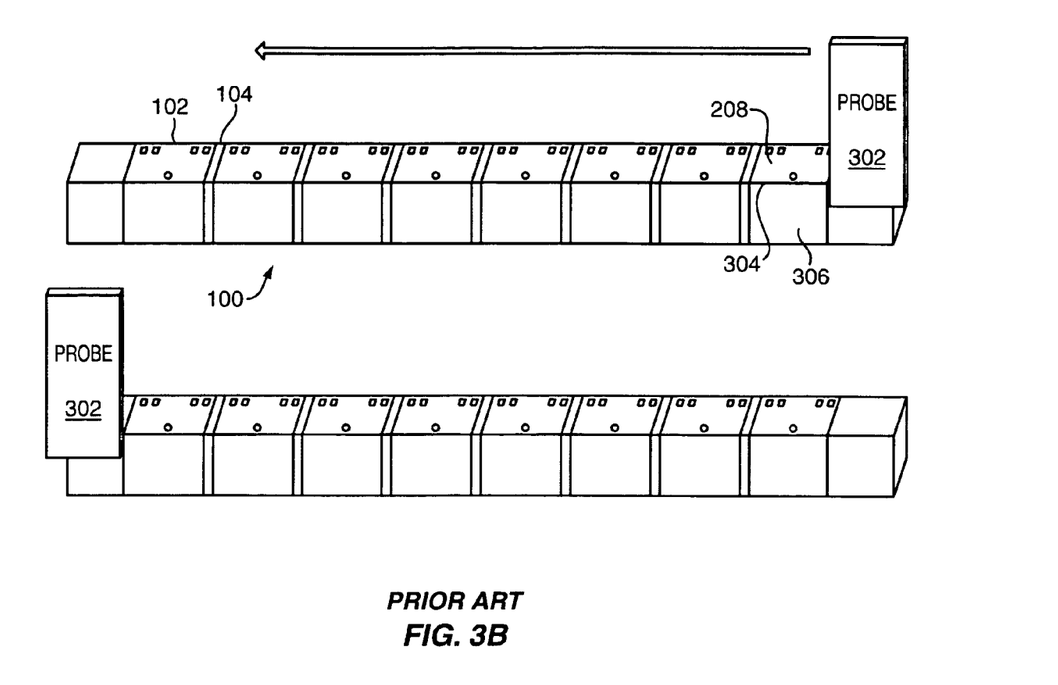
FIG. 3B illustrates a process of applying mechanical stress to a row of sliders with a mechanical stress module.

FIG. 3B illustrates a process of applying mechanical stress to a row of sliders with mechanical stress module 300. The test operator lands mechanical probe 302 on one end of row 100. The test operator slides mechanical probe 302 along the edge 304 joining the air bearing surface (ABS) 306 and the deposit end 208 of each slider 102. The sliding motion of mechanical probe 302 applies mechanical stress to the edge 304 of each slider 102 and consequently applies stress to the MR element in each slider 102. Mechanical probe 302 has a smooth surface so that it won't tear off the deposit end 208 of any of the sliders 102. The amount of stress applied to the edge 304 of each slider depends on the amount of weight 312 and counter weight 313 added to mechanical stress module 300 (see FIG. 3A).

After the stress is applied, the test operator again takes row 100 out of mechanical stress module 300 and places it on the quasi-static measurement system for quasi-static measurements on each slider as described in FIG. 2. The test operator alternates between applying mechanical stress to the edges of the sliders with increasing weight, and taking quasi-static measurements to test the MR elements in the sliders.

One problem with the current testing procedure is that the sliders are tested while the sliders are still in an attached row. It may be desirable to test individual sliders that are not in an attached row, but this is not feasible with the current tester capability because it is very difficult to manually land the current mechanical probe on a slider of a 1 mm width. If a low yield is provided for testing, one should only measure good heads along the row and the overall throughput can be very low. Also, it may be desirable to test sliders with multiple MR element designs at the same time under the same test conditions. This is not currently allowed because sliders in an attached row are inevitably of the same design.

Another problem with the current testing procedure is that the procedure is manual. There is significant manual handling of the sliders between the quasi-static measurements and the mechanical stress procedure which may cause mechanical stress not quantified by the tests. There is also a risk of ESD affecting the sliders. These conditions may negatively affect the accuracy of the tests.

Another problem with the current testing procedure is that the quasi-static measurements are inefficient in that they are performed one at a time on a row of sliders.

FIGS. 4–6, 7A–7C, and 8–14 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 4:
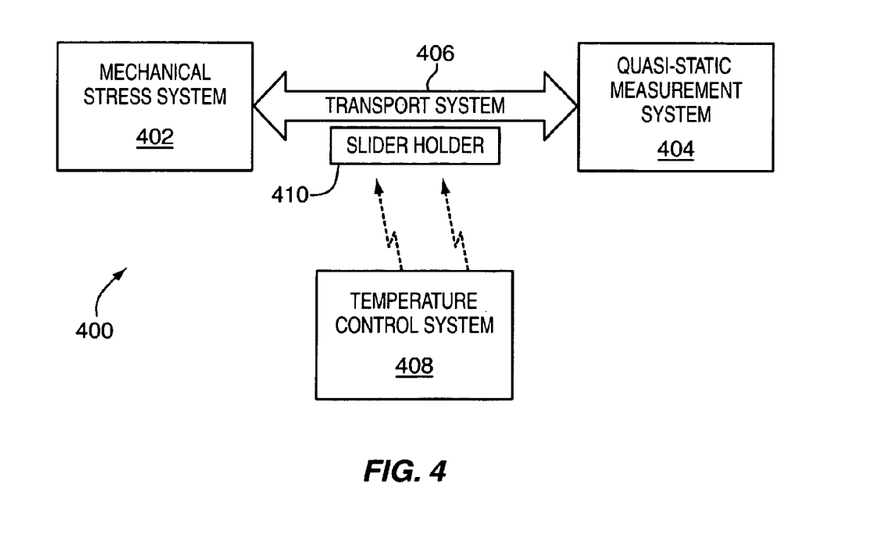
FIG. 4 illustrates a test system in an exemplary embodiment of the invention.

FIG. 4 illustrates a test system 400 in an exemplary embodiment of the invention. Test system 400 is configured to test individual sliders. In other words, the sliders under test do not have to be in an attached row as for previous tests. Test system 400 includes a mechanical stress system 402, a quasi-static measurement system 404, a transport system 406 between mechanical stress system 402 and quasi-static measurement system 404, a temperature control system 408, and a slider holder 410. Test system 400 may include other devices, components, or systems not shown in FIG. 4.

Mechanical stress system 402 comprises any device, component, or system that applies mechanical stress to a slider or sliders. One embodiment of mechanical stress system 402 is shown below in FIG. 13. Quasi-static measurement system 404 comprises any device, component, or system that performs quasi-static measurements on a plurality of sliders simultaneously. One embodiment of quasi-static measurement system 404 is shown below in FIGS. 10–12. Transport system 406 comprises any apparatus or system that transports a slider holder between mechanical stress system 402 and quasi-static measurement system 404. Some embodiments of transport system 406 may include a stage with precision movement controlled using a servo or stepping motor. Slider holder 410 comprises any device or apparatus that secures a plurality of individual sliders in a row. One embodiment of slider holder 410 is shown below in FIGS. 6–9. Individual sliders are sliders that are not attached in a row of a wafer, but are already cut or otherwise separated from one another.

Figure 5:
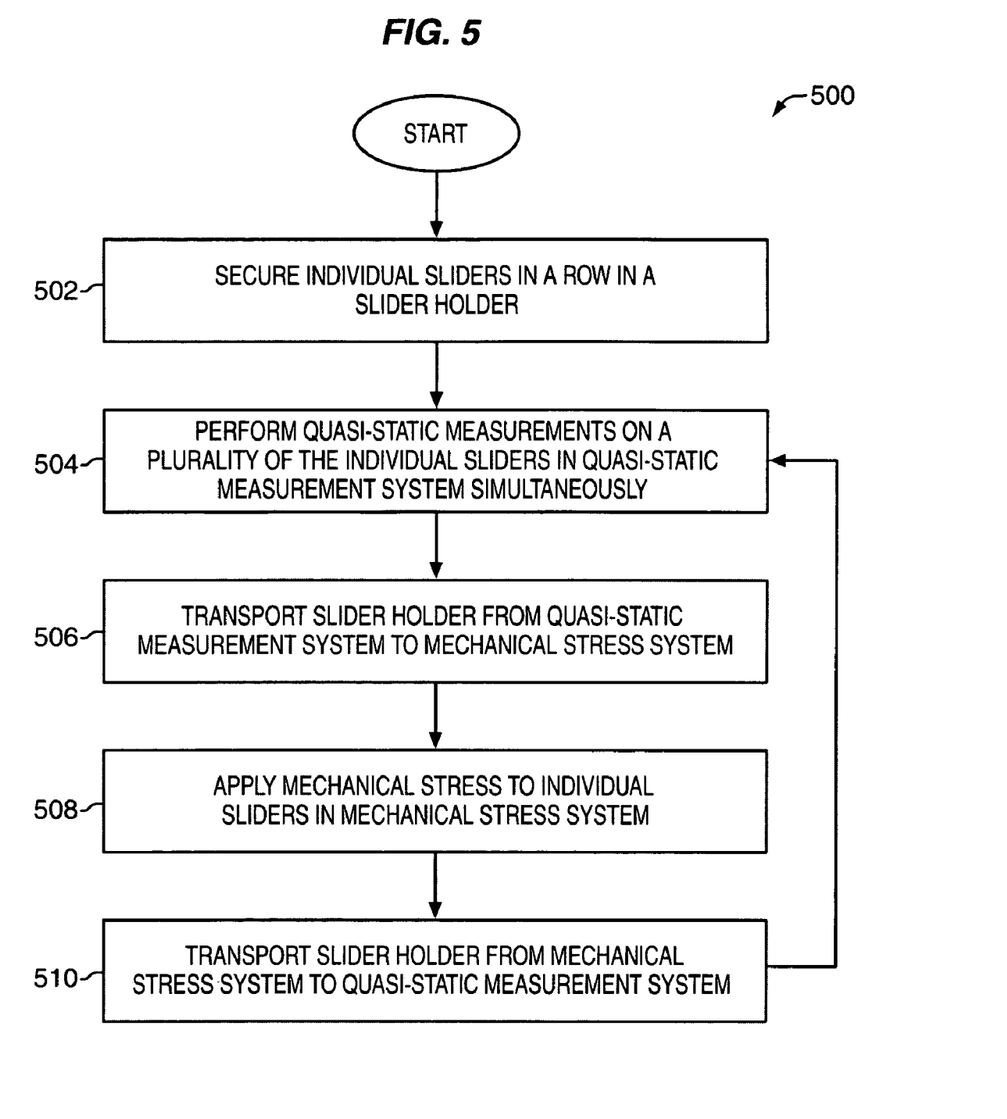
FIG. 5 is a flow chart illustrating a method of testing individual sliders using the test system in FIG. 4 in an exemplary embodiment of the invention.

FIG. 5 is a flow chart illustrating a method 500 of testing individual sliders using test system 400 in an exemplary embodiment of the invention. In step 502, a test operator or an automated system aligns a plurality of individual sliders in a row in slider holder 410 to secure the individual sliders. The individual sliders are arranged in slider holder 410 so that similar surfaces are facing the same direction. For instance, the sliders are arranged so that the air bearing surface (ABS) on each slider is facing the same direction.

Slider holder 410 is then placed on transport system 406 for transport to quasi-static measurement system 404 (see FIG. 4). In step 504, quasi-static measurement system 404 performs quasi-static measurements on a plurality of individual sliders in slider holder 410 simultaneously. Performing quasi-static measurements on a slider includes performing quasi-static measurements on a magneto-resistive (MR) element in the slider. "Simultaneously" in this embodiment means that the quasi-static measurements performed on each slider or a plurality of sliders in slider holder 410 are measured at relatively the same time, rather than one slider at a time. In step 506, transport system 404 transports slider holder 410 to mechanical stress system 402. In step 508, mechanical stress system 402 applies mechanical stress to the individual sliders in slider holder 410. In step 510, transport system 406 transports slider holder 410 to quasi-static measurement system 404. Method 500 then repeats steps 504–510 a desired number of times to complete testing. For each iteration of step 508, mechanical stress system 402 may increase the stress applied to the individual sliders.

In FIG. 4, temperature control system 408 may control the temperature of the individual sliders in slider holder 410. For instance, temperature control system 408 may vary the temperature of the sliders between −20 degrees Celsius and 150 degrees Celsius.

Figure 6:
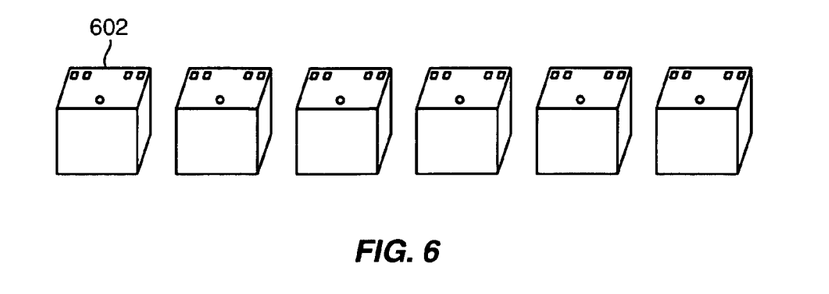
FIGS. 6, 7A–7C, and 8–9 illustrate one embodiment of a slider holder and a manner of securing individual sliders in the slider holder.

FIGS. 6, 7A–7C, and 8–9 illustrate one embodiment of slider holder 410 and a manner of securing individual sliders in slider holder 410. FIG. 6 illustrates a plurality of individual sliders 602. Sliders 602 are not attached and have already been cut or otherwise separated from one another. Although six individual sliders are shown in FIG. 6 for the sake of simplicity, many more sliders could be shown.

Figure 7A:
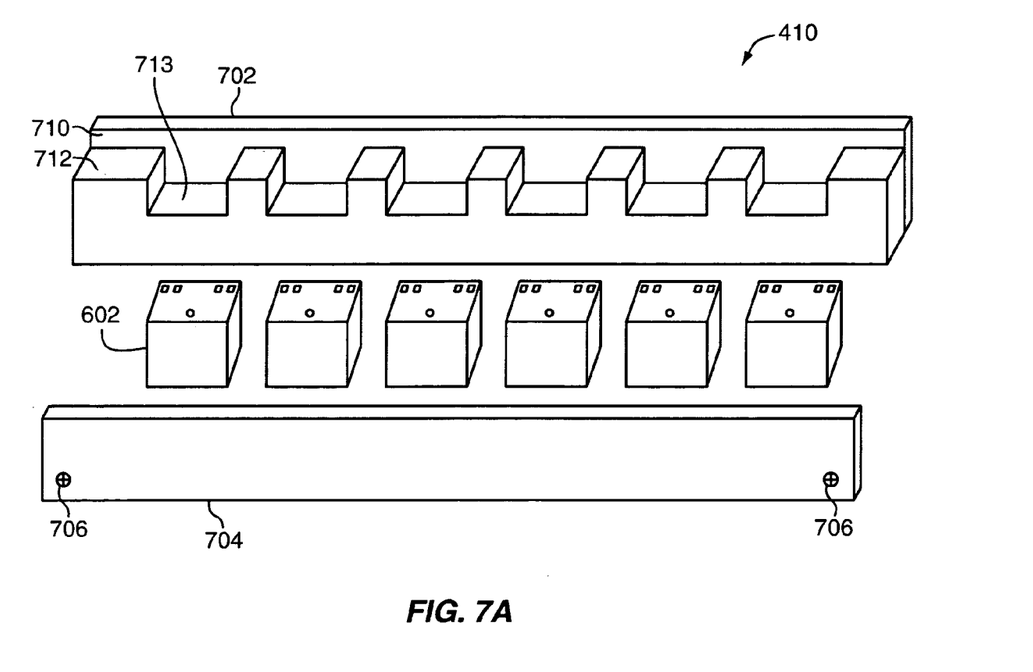
Figure 7B:
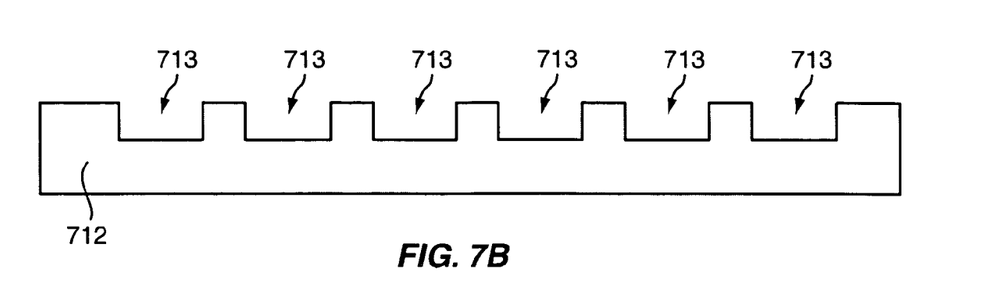
Figure 7C:
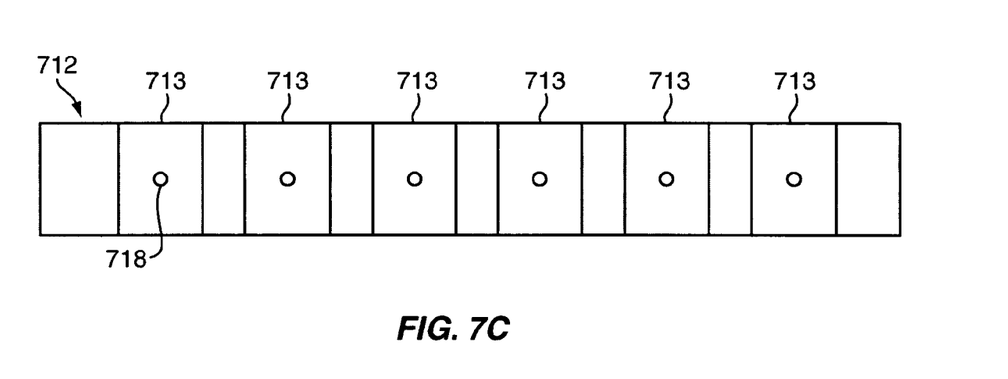

FIG. 7A illustrates one embodiment of slider holder 410 with sliders 602 not yet registered. Slider holder 410 is not limited to the embodiment shown in FIG. 7A but may include many different structures. Slider holder 410 includes a first member 702, a second member 704, and a locking mechanism 706. Members 702–704 and locking mechanism 706 are made of a non-magnetic material. Member 702 includes a vertical surface 710 and a horizontal surface 712 forming a right angle for holding a row of individual sliders 602. Member 702 includes a plurality of pockets 713 having a size corresponding with the size of a slider 602. Each pocket 713 is configured to receive a single slider 602 in this embodiment. In other embodiments, each pocket 713 may be configured to receive two sliders 602, three sliders 602, or more sliders 602. FIG. 7B is a side view of member 712 to illustrate the pockets 713. FIG. 7C is a top view of member 712 to further illustrate the pockets 713. In this figure, each pocket 713 includes one or more holes 718. When a slider 602 is registered in a pocket 713, a vacuum or suction may be applied to hole 718 to help secure the slider 602 in place.

With the individual sliders 602 aligned the pockets 713 of member 702, member 704 may then be interfaced with member 702 such that member 702 and member 704 abut opposing sides of sliders 602 to secure sliders 602 in a row. Locking mechanism 706 then connects member 704 to member 702. Locking mechanism 706 may comprise a bolt, screw, pin, or any other locking means. As previously stated, there may be a vacuum or suction applied to the pockets 713 to assist in holding the sliders in place in slider holder 410.

Figure 8:
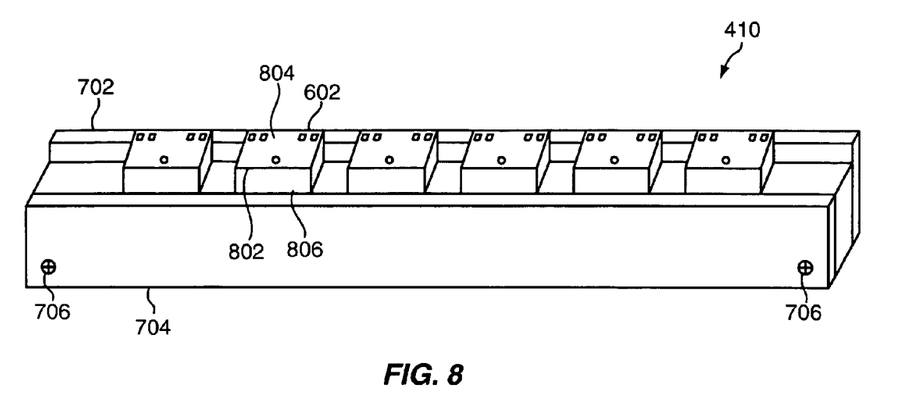

FIG. 8 illustrates slider holder 410 with sliders 602 secured. In this embodiment, the sliders 602 are secured so that a deposit end 804 of each slider 602 is facing upward.

Also, the air bearing surface (ABS) 806 of each slider is facing towards member 704. In this configuration, an edge 802 common to the air bearing surface 806 and the deposit end 804 on each slider 602 is exposed.

Figure 9:
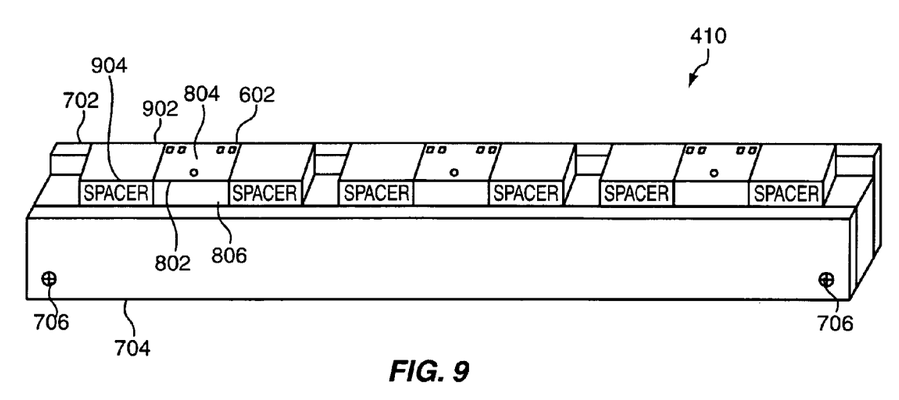

FIG. 9 illustrates another embodiment for securing the sliders 602 in slider holder 410. Instead of securing the sliders 602 adjacent to one another in the pockets 713 of slider holder 410 as shown in FIG. 8, spacers 902 are inserted on either side of sliders 602 in this embodiment. The pockets are larger in the embodiment and have room for two spacers 902 and one slider 602. Spacers 902 have a dimension similar to sliders 602 and may be referred to as "dummy" sliders. More particularly, spacers 902 have an edge 904 in alignment with the edge 802 common to the air bearing surface 806 and the deposit end 804 on each slider 602. Spacers 902 may be used when a probe of a mechanical stress system is larger, as one spacer acts as a landing area for the probe and the other spacer acts as a launch area.

Figure 10:
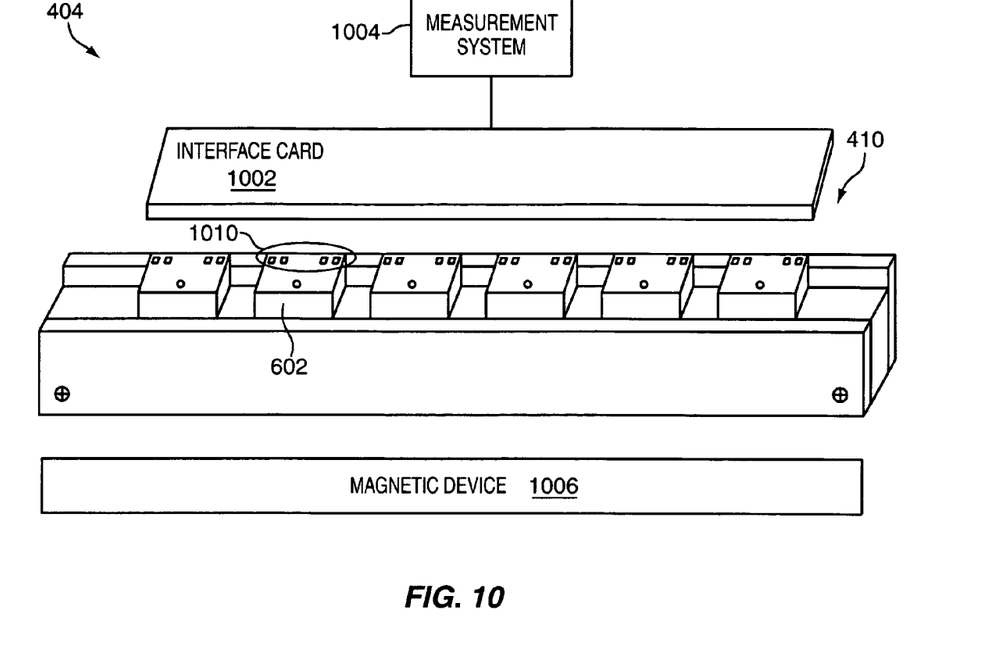
FIGS. 10–12 illustrate one embodiment of a measurement system.
Figure 11:
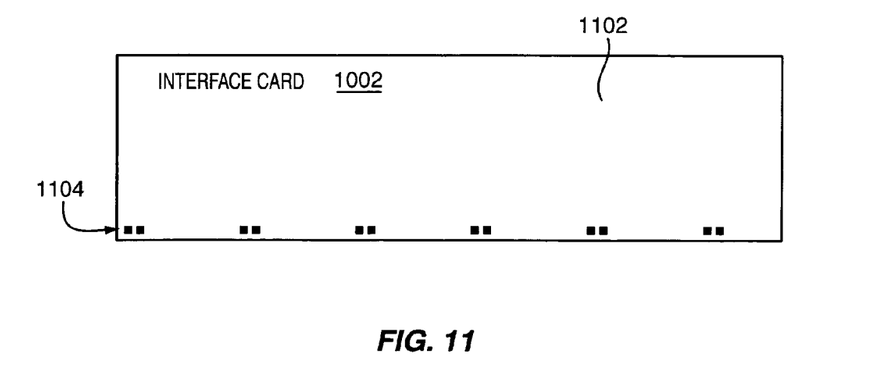
Figure 12:
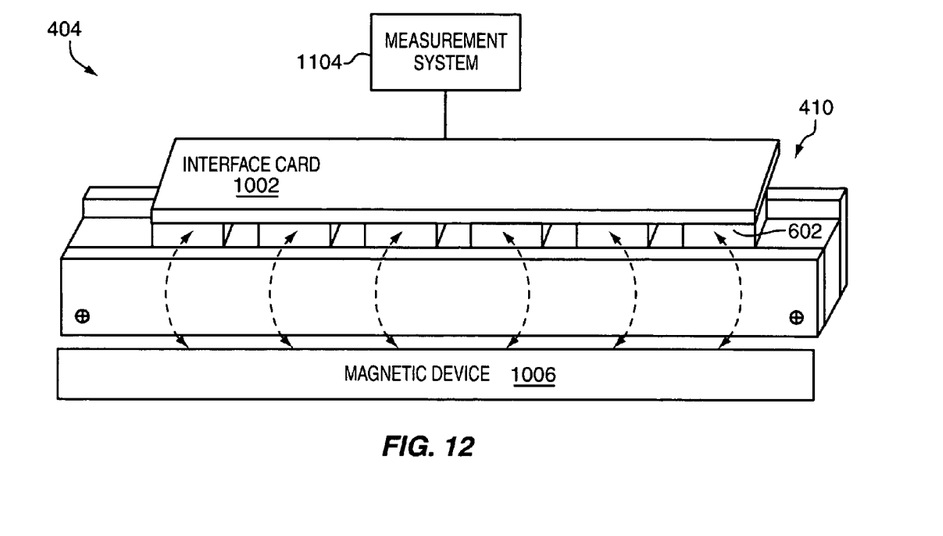

FIGS. 10–12 illustrate one embodiment of quasi-static measurement system 404. Quasi-static measurement system 404 is not limited to the embodiment shown in FIGS. 10–12 but may include many different configurations. In FIG. 10, quasi-static measurement system 404 includes an interface card 1002, a measurement system 1004, and a magnetic device 1006. Interface card 1002 is configured to electrically engage with conductive pads 1010 on sliders 602 secured in a slider holder 410. FIG. 11 shows the bottom surface 1102 of interface card 1002. Bottom surface 1102 of interface card 1002 includes a plurality of contacts 1104 configured to electrically engage with conductive pads 1010 on the sliders 602. The pattern of the contacts 1104 is set so that two contacts 1104 on interface card 1002 contact two conductive pads 1010 on each of the sliders 602 in the slider holder 410 simultaneously. In this embodiment, the contacts 1104 on the interface card are set so that two contacts 1104 contact two read-sensor pads 1010, as opposed to two write-sensor pads.

FIG. 12 illustrates quasi-static measurement system 404 in operation. Interface card 1002 is lowered onto the sliders 602 in slider holder 410 so that the contacts 1104 on interface card 1002 engage with conductive pads 1010 (not shown) on the sliders 602. Magnetic device 1006 is positioned proximate to the sliders 602 in slider holder 410 and emits a magnetic field toward the sliders 602. Through interface card 1002, measurement system 1004 performs quasi-static measurements on the MR elements in the sliders 602 due to the magnetic field. Quasi-static measurement system 404 advantageously allows for testing of multiple sliders simultaneously through interface card 1002.

Quasi-static measurement system 404 may include a control system (not shown), such as a computer system, that provides for automated operation. For instance, the control system may lower interface card 1002 to interface with sliders 602 when a slider holder 410 is transported to quasi-static measurement system 404. The control system may also raise the interface card out of the way when the resistance measurements are complete.

Figure 13:
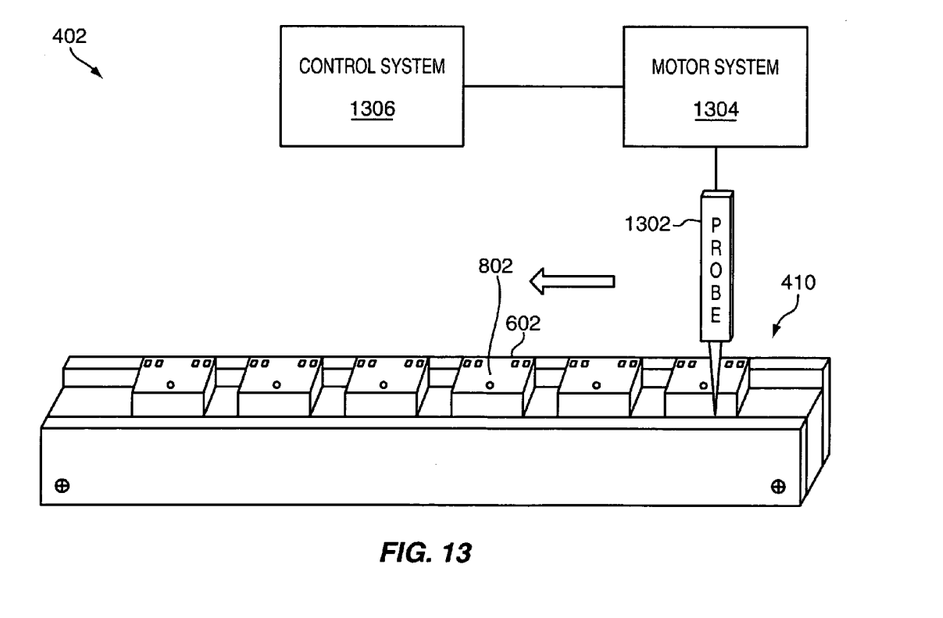
FIGS. 13–14 illustrate one embodiment of a mechanical stress system.

FIG. 13 illustrates one embodiment of mechanical stress system 402. Mechanical stress system 402 is not limited to the embodiment shown in FIG. 13 but may include many different configurations. Mechanical stress system 402 comprises a probe 1302, a motor system 1304 coupled to probe 1302, and a control system 1306. Control system 1306 is configured to control motor system 1304 to provide a desired motion to probe 1302. Control system 1306 may comprise a computer system that executes instructions to control motor system 1304 to provide automated movement of probe 1302. Alternatively, control system 1306 may comprise a user interface to allow a test operator to control the movement of probe 1302. Motor system 1304 may move probe 1302 in multiple dimensions.

Based on the control of control system 1306, motor system 1304 slides probe 1302 along an edge 802 of the sliders 602 in slider holder 410 to apply mechanical stress to each of the sliders 602. Edge 802 comprises the edge common to the air bearing surface and the deposit end on each slider 602. The amount of stress may be varied by motor system 1304, a weight attached to probe 1302, or some other means. For instance, mechanical stress system 402 may include a weight dispenser (not shown) that affects the stress applied to probe 1302. To increase the stress applied by probe 1302, the weight dispenser automatically adds more weight to increase the stress applied by probe 1302. The weight may comprise solid weights that are automatically and incrementally loaded onto a member to add weight to probe 1302 and increase the stress applied by probe 1302. The weight may alternatively comprise a fluid or liquid, such as water, that is automatically added to a container to add weight to probe 1302 and increase the stress applied by probe 1302.

Probe 1302 is made of a material that slides along edges 802 with the same or less friction than the mechanical probes previously used. Probe 1302 may include a roller-type tip that rolls along edges 802 in applying the stress. Probe 1302 is also made of a material harder than the overcoat material used on the previous mechanical probes to reduce wearing of probe 1302. The size of probe 1302 may also be smaller than the previous mechanical probes to allow for more precise control over the movement of the probe 1302.

FIG. 13 shows the sliders 602 secured adjacent to each other in slider holder 410. Spacers may also be used in slider holder 410 as shown in FIG. 9. In that embodiment, probe 1302 lands on a spacer bordering one side of a slider 602, moves along the edge of the slider 602 and onto a spacer bordering the other side of the slider 602, and then lifts off of the spacer. Probe 1302 then moves to another spacer bordering another slider 602 and performs the same operation.

Figure 14:
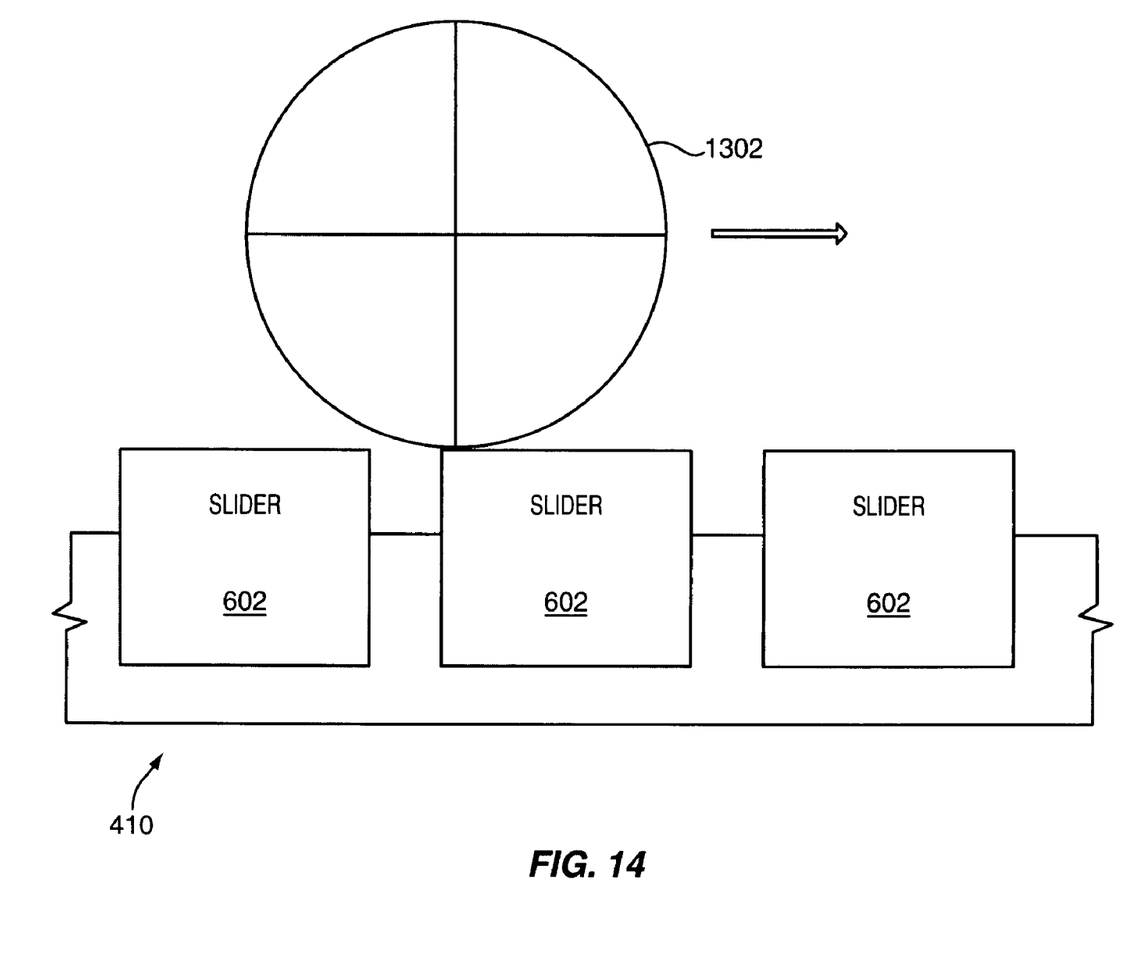

FIG. 14 shows a close up view of probe 1302 moving along the edges of sliders 602 in slider holder 410. In FIG. 14, probe 1302 lands on one end on an edge of a slider 602, slides approximately 500 μm along the edge of the slider 602, and the lifts off the other end of the slider 602. The same process happens for each slider 602 in slider holder 410.

In summary, test system 400 provides many advantages over the prior test procedures. Test system 400 allows for testing of individual sliders which was not feasible with previous test procedures. The slider holder 410 of test system 400 secures individual sliders in a row to allow for testing of multiple individual sliders at the same time. Because individual sliders are tested, sliders of different designs may be inserted in the slider holder 410 and tested at the same time. Consequently, sliders of different designs can be evaluated under the same test conditions, such as the same mechanical stress, the same probe surface, etc.

Another advantage is that test system 400 is more robust against unwanted mechanical stress or ESD. The individual sliders under test are secured in the slider holder 410 throughout the testing procedure. Slider holder 410 is transported between quasi-static measurement system 404 and mechanical stress system 402 via transport system 406 which eliminates or reduces the need for manually handling the sliders under test.

Another advantage is that test system 400 is more efficient than prior test procedures. Test system 400 can be fully automated. Mechanical stress system 402, quasi-static measurement system 404, and transport system 406 can each be fully automated to reduce testing time. Also, quasi-static measurement system 404 is able to perform quasi-static measurements on the MR elements in the sliders simultaneously instead of one at a time. If there are forty sliders in slider holder 410, for instance, quasi-static measurement system 404 can be forty times more efficient than prior test procedures.

We claim:

1. A test system, comprising:
   a slider holder that secures individual sliders in a row;
   a quasi-static measurement system that performs quasi-static measurements on a plurality of the individual sliders simultaneously;
   a mechanical stress system that applies mechanical stress to each of the individual sliders; and
   a transport system that transports the slider holder including the individual sliders between the quasi-static measurement system and the mechanical stress system.

2. The test system of claim 1 wherein the slider holder comprises:
   a first member;
   a second member; and
   a locking mechanism for connecting the first member and the second member,
   wherein the first member and the second member interface with opposing sides of the individual sliders to secure the individual sliders in the row.

3. The test system of claim 1 wherein the quasi-static measurement system comprises:
   a magnetic device that emits a magnetic field in the proximity of the plurality of the individual sliders;
   an interface card having a plurality of contacts that interface with conductive pads on each of the plurality of the individual sliders; and
   a measurement system coupled to the interface card that performs the quasi-static measurements on a magnetoresistive (MR) element in each of the plurality of the individual sliders simultaneously.

4. The test system of claim 1 wherein the mechanical stress system comprises:
   a probe;
   a motor system coupled to the probe; and
   a control system that controls the motor system to slide the probe along an edge of each of the individual sliders to apply mechanical stress to each of the individual sliders.

5. The test system of claim 4 wherein the edge comprises the edge common to an air bearing surface (ABS) and a deposit end of each of the individual sliders.

6. The test system of claim 1 wherein the slider holder includes at least one spacer inserted on either side of the individual sliders.

7. The test system of claim 1 further comprising:
   a temperature control system that controls the temperature of the individual sliders.

8. The test system of claim 1 wherein the slider holder is of a non-magnetic material.

9. A method for testing individual sliders, the method comprising:
   (a) securing the individual sliders in a row in a slider holder;
   (b) performing quasi-static measurements on a plurality of the individual sliders simultaneously in a quasi-static measurement system;
   (c) transporting the slider holder to a mechanical stress system;
   (d) applying mechanical stress to the individual sliders with the mechanical stress system; and
   (e) transporting the slider holder to the quasi-static measurement system and repeating (b) through (e).

10. The method of claim 9 wherein securing the individual sliders in a row in a slider holder comprises:
    securing the individual sliders in the slider holder where an edge common to an air bearing surface and a deposit end on each of the individual sliders is exposed.

11. The method of claim 9 wherein securing the individual sliders in a row in a slider holder comprises:
    inserting at least one spacer on either side of the individual sliders.

12. The method of claim 9 wherein performing quasi-static measurements on a plurality of the individual sliders comprises:
    positioning an interface card in relation to the plurality of the individual sliders so that a plurality of contacts on the interface card interfaces with conductive pads on each of the plurality of the individual sliders;
    emitting a magnetic field from a magnetic device in the proximity of the plurality of the individual sliders; and
    performing the quasi-static measurements on a magnetoresistive (MR) element in each of the plurality of the individual sliders simultaneously.

13. The method of claim 9 wherein applying mechanical stress to each of the individual sliders with the mechanical stress system comprises:
    sliding a probe along an edge of each of the individual sliders to apply mechanical stress to each of the individual sliders.

14. The method of claim 13 wherein the edge comprises the edge common to an air bearing surface (ABS) and a deposit end of each of the individual sliders.

15. The method of claim 9 further comprising:
    controlling the temperature of the individual sliders.

16. A test system, comprising:
    a slider holder that secures individual sliders in a row where an edge common to an air bearing surface and a deposit end on each of the individual sliders is exposed;
    a quasi-static measurement system that performs quasi-static measurements on each of the individual sliders simultaneously;
    a mechanical stress system that slides a probe along the edge of each of the individual sliders to apply mechanical stress to each of the individual sliders; and
    a transport system that transports the slider holder including the individual sliders between the quasi-static measurement system and the mechanical stress system.

17. The test system of claim 16 wherein the slider holder comprises:
    a first member;
    a second member; and
    a locking mechanism for connecting the first member and the second member,
    wherein the first member and the second member interface with opposing sides of the individual sliders to secure the individual sliders in the row.

18. The test system of claim 17 wherein the quasi-static measurement system comprises:
- a magnetic device that emits a magnetic field in the proximity of the individual sliders;
- an interface card having a plurality of contacts that interface with conductive pads on each of the individual sliders; and
- a measurement system coupled to the interface card that performs the quasi-static measurements on a magneto-resistive (MR) element in each of the individual sliders simultaneously.

19. The test system of claim 16 wherein the mechanical stress system comprises:
- the probe;
- a motor system coupled to the probe; and
- a control system that controls the motor system to slide the probe along the edge of each of the individual sliders to apply mechanical stress to each of the individual sliders.

20. The test system of claim 16 wherein the slider holder includes at least one spacer inserted on either side of the individual sliders.

21. The test system of claim 16 further comprising:
- a temperature control system that controls the temperature of the individual sliders.

22. A method for testing individual sliders, the method comprising:
- (a) securing the individual sliders in a row in a slider holder where an edge common to an air bearing surface and a deposit end on each of the individual sliders is exposed;
- (b) transporting the slider holder to a quasi-static measurement system;
- (c) performing quasi-static measurements on a magneto-resistive (MR) element in each of the individual sliders simultaneously in the quasi-static measurement system;
- (d) transporting the slider holder to a mechanical stress system;
- (e) sliding a probe of the mechanical stress system along the edge of each of the individual sliders to apply mechanical stress to each of the individual sliders; and
- (f) repeating (b) through (f).

23. The method of claim 22 wherein performing quasi-static measurements on a magneto-resistive (MR) element in each of the individual sliders simultaneously comprises:
- positioning an interface card for the quasi-static measurement system m relation to the individual sliders so that a plurality of contacts on the interface card interface with conductive pads on each of the individual sliders; and
- emitting a magnetic field from a magnetic device in the quasi-static measurement system in the proximity of the individual sliders to perform the quasi-static measurements on the magneto-resistive (MR) element in each of the individual sliders simultaneously.

24. The method of claim 22 wherein securing the individual sliders in a row in a slider holder comprises:
- inserting at least one spacer on either side of the individual sliders.

25. The method of claim 22 further comprising:
controlling the temperature of the individual sliders.

26. A quasi-static measurement system, comprising:
- a magnetic device that emits a magnetic field in the proximity of a plurality of individual sliders secured in a row in a slider holder;
- an interface card having a plurality of contacts that interface with conductive pads on each of the plurality of individual sliders; and
- a measurement system coupled to the interface card that performs quasi-static measurements on a magneto-resistive (MR) element in each of the plurality of individual sliders simultaneously.

* * * * *

UNITED STATES PATENT AND TRADEMARK OFFICE
CERTIFICATE OF CORRECTION

| | | |
|---|---|---|
| PATENT NO. | : 7,165,462 B1 | Page 1 of 1 |
| APPLICATION NO. | : 10/999184 | |
| DATED | : January 23, 2007 | |
| INVENTOR(S) | : Luo et al. | |

It is certified that error appears in the above-identified patent and that said Letters Patent is hereby corrected as shown below:

On the title page,
Item [56] "References Cited", U.S. Patent "6,950,117" should read U.S. Patent --6,960,117--.

In claim 23, line 9, "m relation" should read --in relation--.

Signed and Sealed this

Twenty-second Day of May, 2007

JON W. DUDAS
*Director of the United States Patent and Trademark Office*